United States Patent [19]

Choe

[11] Patent Number: 5,033,919
[45] Date of Patent: Jul. 23, 1991

[54] STABILIZED TAP WITH AIR RELEASE

[76] Inventor: Cha Y. Choe, 3923 W. Ainslie, Chicago, Ill. 60625

[21] Appl. No.: 558,150

[22] Filed: Jul. 26, 1990

Related U.S. Application Data

[63] Continuation-in-part of Ser. No. 429,529, Oct. 31, 1989, abandoned.

[51] Int. Cl.$^5$ ............................................. B23G 5/06
[52] U.S. Cl. ................................. 408/217; 10/141 R; 408/219
[58] Field of Search ................. 10/111, 123 R, 123 P, 10/123 S, 140, 141 R; 408/216, 217, 219, 221, 222, 226

[56] References Cited

U.S. PATENT DOCUMENTS

| 139,651 | 6/1873 | Barthel | 10/141 R |
| 177,731 | 5/1876 | Martin | 408/222 |
| 689,555 | 12/1901 | Mann et al. | 10/111 X |
| 896,503 | 8/1908 | Zogg | 10/111 X |
| 1,345,425 | 7/1920 | Wells | 408/219 |
| 2,202,236 | 5/1940 | Stimson | 408/222 |
| 3,313,186 | 4/1967 | Rochon | 10/141 R X |
| 4,708,542 | 11/1987 | Emmanuelli | 408/219 X |

FOREIGN PATENT DOCUMENTS

| 1442240 | 5/1966 | France | 10/141 B |
| 62-148118 | 7/1987 | Japan | 10/141 R |
| 753568 | 8/1980 | U.S.S.R. | 10/141 R |

Primary Examiner—E. Michael Combs
Attorney, Agent, or Firm—Richard C. Litman

[57] ABSTRACT

The invention comprises means to align and stabilize taps prior to the commencement of the actual cutting of the threads and to release air while tapping. On the tap a constant diameter stabilizer is placed before the tapered chamfer section of the tap. This front portion is of a diameter slightly less than the inner diameter of the hole to be tapped. The front portion is inserted into the hole and acts to align the tap and avoid cross-threading of the tapped hole. To release air trapped in a blind hole, the flutes of the tap are extended through the stabilizer portion.

1 Claim, 1 Drawing Sheet

STABILIZED TAP WITH AIR RELEASE

CROSS REFERENCE TO RELATED APPLICATION

This application is a Continuation-In-Part of U.S. Pat. application Ser. No. 07/429,509, filed Oct. 31, 1989, entitled "Stabilized Tap and Threading Die" now abandoned.

FIELD OF THE INVENTION

The present invention relates to taps which include a cylindrical guide or stabilizer section which aligns the tap prior to thread cutting.

DESCRIPTION OF THE PRIOR ART

The following patents are felt to be related to the present invention, but do not disclose either singly or in combination the applicants' unique device.

U.S. Pat. No. 1,963,542 issued to Bergstrom discloses a self-tapping screw having a short cYlindrical portion at the end thereof which pilots the screw when it is being screwed into an untapped hole.

U.S. Pat. No. 1,908,575 issued to Tucker discloses a tap with a guiding tapering end section preceding the chamfer. The tapered end would not alloW for accurate alignment of the tap in a pipe. The narrow section at the end allows for axial misalignment on the initial insertion of the tap into a pipe.

Ordinary taps and threading dies use tapered tips that make it difficult to align the tap or threading die. Care and time must be taken to properly align the devices or it is possible that the tap or die will break. The resulting thread at minimum will not be properly cut if the tap or threaded die was not properly aligned. It takes many hours of use and experience with these devices in order to consistentlY produce well aligned threads on pipes and shafts.

To align the tap or die, a cylindrical stabilizer section has been used.

Mann, in U.S. Pat. No. 689,555 shows a tap with a stabilizer section.

Wells, in U.S. Pat. No. 1,345,425 teaches adding a cylindrical stabilizer at the tip of a tap.

Certain foreign patents also show taps with cylindrical stabilizers.

SUMMARY OF THE INVENTION

The present invention comprises adding a straight constant diameter stabilizer to the end of a tap. The stabilizer would be applied to the end of the tapered chamfer region. This constant diameter end portion would allow for the straight insertion of the tap into the pipe interior with a minimum of misalignment.

Because the stabilizer to function must be very close in diameter to the hole to be tapped or threaded air pressure can build up in a tapped hole. This can interfere with the tapping operation.

Accordingly, it is one object of the present invention to provide a tap having alignment means located on the end of the tap before the chamfered cutting section of the tap.

It is a further object of the present invention to provide a tap having a constant diameter insert located on the end of the tap before the chamfered cutting section.

A final object is to provide a tap having means to release trapped air when tapping a blind hole.

These and other objects of the present invention will become readily apparent upon further review of the following specification and drawings.

A DETAILED DESCRIPTION OF THE PREFERRED EMBODIMENT

Figure 1:
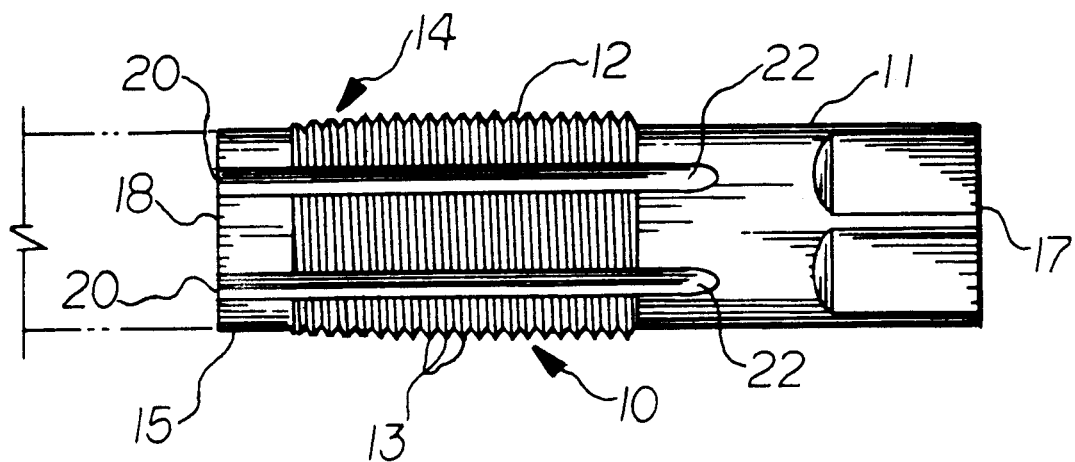
FIG. 1 is a perspective view of the tap with the stabilizer and grooves.

The present invention of a modified tap 10 is shown in FIG. 1. This modified tap 10 comprises an elongated body or shank 11 by which the tap is gripped at the end 17 by a chuck (not shown), a segmented threaded portion 12 which has the cutting teeth 13, a progressively reduced diameter threaded chamfer region 14 that serves as the tapering introduction to the primary, constant diameter cutting teeth 13, and a uniform diameter stabilizer 15 having a flat circular face 18 perpendicular to the longitudinal axis of the tap that serves to align the tap 10 into a round blind hole 2.

The stabilizer 15 would have the smallest diameter, with the chamfer region 14 and the threaded region 12 having increasingly greater diameters. The stabilizer 15 would have a diameter that insures a very close, but interference-free fit within the inner diameter 2 of the blind hole to be tapped.

When tapping a blind hole (that is, a hole with a closed bottom, such as is produced by drilling into a bodY without drilling through) air pressure will build up in the hole as the tap advances. This build-up will be aggravated by the use of liquid tapping lubricants, which is common. The fit between the stabilizer 15 and the hole must be close to align the tap, unless the stabilizer 15 is quite long, in which case the tap's utility is limited to only partially tapping a hole.

Figure 2:
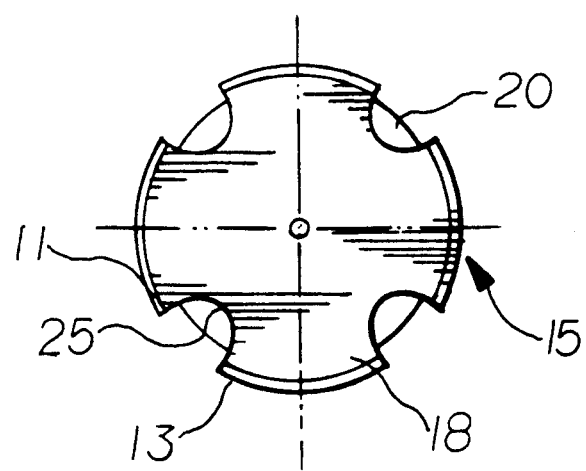
FIG. 2 is an end view of the tap from the stabilizer end.

To obviate this pressure, which opposes the motion of the tap, the present invention has longitudinal shallow grooves 20 along the length of the stabilizer which allow the release of air while maintaining an arbitrarily close fit between the stabilizer and hole. These grooves 20 are continuous with the flutes ordinarilY found on a tap between the sections of cutting thread 13 and extend entirely through the end of stabilizer 15, forming a plurality of arcuate cut-outs 25 on the periphery of flat circular face 18 as shown in FIG. 2. The arcuate cut-outs 25 intercept an arc on the periphery of flat circular face 18 that is less than 40 degrees. With this arrangement, a substantial arc length is provided for the threaded portions of the tap. This allows the tap to withstand the high shear stress produced during the cutting operation. Also, a substantial arc length remains on the periphery of the stabilizer 15, which serves to sturdy the tap in a hole. The flute ends 22 are beyond the cutting teeth 13 distal the stabilizer. The groove must be continuous with the flute to allow the air to escape from the hole past the teeth 13 and out the ends of the flutes 22. Preferably, the groove and the flute are one and the same.

As is conventional with these sort of tools, the tap 10 would be made of hardened steel that is necessary for these cutting devices. Usually it is the threaded sections of these tools that are treated in such a manner, since it is the threads that will take the highest stresses during the cutting. The stabilizer section need not be treated to a great amount of hardening since no cutting is actually done in these sections.

It is to be understood that the present invention is not limited to the sole embodiment described above, but encompasses any and all embodiments within the scope of the following claims.

I claim:

1. In a tap having cutting teeth adapted to cut threads into the cylindrical walls of a hole having a hole diameter, said tap having a generally cylindrical body, a rear end for insertion into a tap handle, and a forward end for insertion into a hole to be tapped, said tap having a progressively reduced diameter threaded chamfer region and said cutting teeth having a constant diameter, said tap having longitudinal flutes between sections of said cutting teeth, the improvement comprising:

a cylindrical stabilizer at the forward end of said tap, said stabilizer having an axis co-linear with a longitudinal axis of the body of said tap and a flat circular face perpendicular to said longitudinal axis, the diameter of said stabilizer being less than said hole diameter such that said stabilizer has a close, but interference-free fit within said hole; and longitudinal groove in said stabilizer for releasing air, said grooves being continuous with said flutes and extending entirely through said stabilizer and forming a plurality of arcuate cut-outs on the periphery of said flat circular face, each of said arcuate cut-outs intercepting an arc of less than 40 degrees on the periphery of said flat circular face, whereby as the hole is tapped, air may be released through said arcuate cut-outs, through said grooves and thence through said flutes continuous with said grooves, and air pressure released in the hole.

* * * * *